US 9,443,430 B2

United States Patent
Beaurepaire

(10) Patent No.: US 9,443,430 B2
(45) Date of Patent: Sep. 13, 2016

(54) METHOD AND APPARATUS FOR DETERMINING AN ADJUSTMENT IN PARKING POSITION BASED ON PROXIMATE PARKED VEHICLE INFORMATION

(71) Applicant: HERE Global B.V., Veldhoven (NL)

(72) Inventor: Jerome Beaurepaire, Berlin (DE)

(73) Assignee: HERE GLOBAL B.V., Veldhoven (NL)

( * ) Notice: Subject to any disclaimer, the term of this patent is extended or adjusted under 35 U.S.C. 154(b) by 411 days.

(21) Appl. No.: 14/024,086

(22) Filed: Sep. 11, 2013

(65) Prior Publication Data

US 2015/0070196 A1  Mar. 12, 2015

(51) Int. Cl.
  *G08G 1/16* (2006.01)
  *B62D 15/02* (2006.01)
  *G08G 1/14* (2006.01)

(52) U.S. Cl.
  CPC .......... *G08G 1/168* (2013.01); *B62D 15/028* (2013.01); *G08G 1/162* (2013.01); *G08G 1/14* (2013.01); *G08G 1/147* (2013.01)

(58) Field of Classification Search
  None
  See application file for complete search history.

(56) References Cited

U.S. PATENT DOCUMENTS

2007/0282489 A1* 12/2007 Boss .................. B62D 15/0285
　　　　　　　　　　　　　　　　　　701/2
2010/0152972 A1* 6/2010 Attard ................ B62D 15/027
　　　　　　　　　　　　　　　　　　701/42
2011/0068953 A1* 3/2011 Toledo ............... B62D 15/0285
　　　　　　　　　　　　　　　　　　340/932.2
2011/0093168 A1* 4/2011 Barth ................... B62D 15/028
　　　　　　　　　　　　　　　　　　701/41

FOREIGN PATENT DOCUMENTS

| DE | 102004037641 A1 | 3/2006 |
| DE | 102008014969 A1 | 9/2009 |
| DE | 102008042743 A1 | 4/2010 |
| DE | 102009057647 A1 | 6/2011 |

OTHER PUBLICATIONS

Barry, "Ford Builds a Self-Parking Car. Sort of.", retrieved from web page on Dec. 12, 2013 from http://www.wired.com/autopia/2008/12/fords-that-park/, dated Dec. 31, 2008, pp. 1-3.

"Hu_innovationteam11", retrieved from web page on Dec. 12, 2013 from http://s3.amazonaws.com/challengepost/zip_files/production/1291/zip_files/Connected%20Vehicle%20Challenge.pdf?1304306923, 3 pages.

(Continued)

*Primary Examiner* — Mohamed Barakat
(74) *Attorney, Agent, or Firm* — Ditthavong & Steiner, P.C.

(57) ABSTRACT

An approach is provided for causing, at least in part, an initiation of at least one communication session between at least one parking vehicle and one or more proximate parked vehicles. The approach also involves determining at least one measure of space associated with the one or more proximate parked vehicles based, at least in part, on the at least one communication session. The approach further involves processing and/or facilitating the processing of the at least one measure of space to determine, at least in part, at least one adjustment of a parking position of the at least one parking vehicle relative to the one or more proximate parked vehicles.

20 Claims, 14 Drawing Sheets

(56) References Cited

OTHER PUBLICATIONS

International Preliminary Report for corresponding International Application No. PCT/EP2014/068456, mailed Nov. 13, 2014, 4 pages.

Notification of Transmittal of the International Search Report and the Written Opinion of the International Searching Authority, or the Declaration; Written Opinion of the International Searching Authority for corresponding International Application No. PCT/EP2014/068456, mailed Nov. 13, 2014, 10 pages.

* cited by examiner

METHOD AND APPARATUS FOR DETERMINING AN ADJUSTMENT IN PARKING POSITION BASED ON PROXIMATE PARKED VEHICLE INFORMATION

BACKGROUND

Service providers and device manufacturers (e.g., wireless, cellular, etc.) are continually challenged to deliver value and convenience to consumers by, for example, providing compelling network services. One area of interest has been the development of sensor based services to provide parking supervision to the users of one or more vehicles. At present, users are having difficulty in finding a suitable parking positions for their respective vehicles bearing in mind the nearby parked vehicles and the gaps those parked vehicles have around them. In other words, it is tedious for users to exit their vehicles to check the gaps between their vehicles and the other parked vehicles. Therefore, service providers and device manufacturers face significant technical challenges in finding a suitable adjustment in parking positions for one or more vehicles based, at least in part, on the dimensions of the parking vehicles and the gaps between the parked vehicles.

SOME EXAMPLE EMBODIMENTS

Therefore, there is a need for an approach for causing an initiation of at least one communication session between at least one parking vehicle and one or more proximate parked vehicles to determine at least one measure of space associated with the one or more proximate parked vehicles to determine an adjustment of a parking position of the at least one parking vehicle relative to the one or more proximate parked vehicles.

According to one embodiment, a method comprises causing, at least in part, an initiation of at least one communication session between at least one parking vehicle and one or more proximate parked vehicles. The method also comprises determining at least one measure of space associated with the one or more proximate parked vehicles based, at least in part, on the at least one communication session. The method further comprises processing and/or facilitating the processing of the at least one measure of space to determine, at least in part, at least one adjustment of a parking position of the at least one parking vehicle relative to the one or more proximate parked vehicles.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, an initiation of at least one communication session between at least one parking vehicle and one or more proximate parked vehicles. The apparatus is also caused to determine at least one measure of space associated with the one or more proximate parked vehicles based, at least in part, on the at least one communication session. The apparatus is further caused to process and/or facilitate the processing of the at least one measure of space to determine, at least in part, at least one adjustment of a parking position of the at least one parking vehicle relative to the one or more proximate parked vehicles.

According to another embodiment, a computer-readable storage medium carries one or more sequences of one or more instructions which, when executed by one or more processors, cause, at least in part, an apparatus to cause, at least in part, an initiation of at least one communication session between at least one parking vehicle and one or more proximate parked vehicles. The apparatus is also caused to determine at least one measure of space associated with the one or more proximate parked vehicles based, at least in part, on the at least one communication session. The apparatus is further caused to process and/or facilitate the processing of the at least one measure of space to determine, at least in part, at least one adjustment of a parking position of the at least one parking vehicle relative to the one or more proximate parked vehicles.

According to another embodiment, an apparatus comprises means for causing, at least in part, an initiation of at least one communication session between at least one parking vehicle and one or more proximate parked vehicles. The apparatus also comprises means for determining at least one measure of space associated with the one or more proximate parked vehicles based, at least in part, on the at least one communication session. The apparatus further comprises means for processing and/or facilitating the processing of the at least one measure of space to determine, at least in part, at least one adjustment of a parking position of the at least one parking vehicle relative to the one or more proximate parked vehicles.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for causing an initiation of at least one communication session between at least one parking vehicle and one or more proximate parked vehicles to determine at least one measure of space associated with the one or more proximate parked vehicles to determine an adjustment of a parking position of the at least one parking vehicle relative to the one or more proximate parked vehicles are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
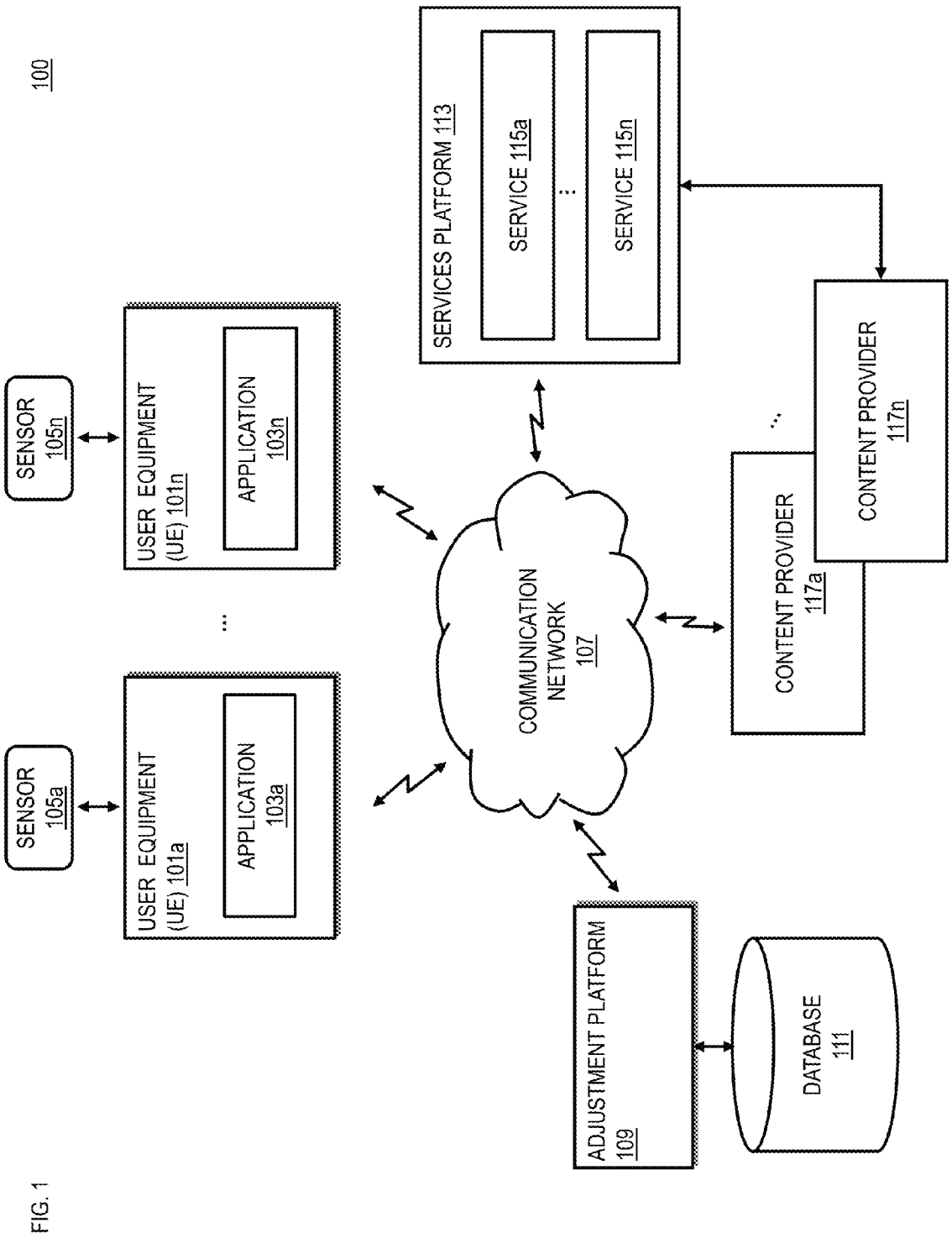
FIG. 1 is a diagram of a system capable of causing an initiation of at least one communication session between at least one parking vehicle and one or more proximate parked vehicles to determine at least one measure of space associated with the one or more proximate parked vehicles to determine an adjustment of a parking position of the at least one parking vehicle relative to the one or more proximate parked vehicles, according to one embodiment.

FIG. 1 is a diagram of a system capable of causing an initiation of at least one communication session between at least one parking vehicle and one or more proximate parked vehicles to determine at least one measure of space associated with the one or more proximate parked vehicles to determine an adjustment of a parking position of the at least one parking vehicle relative to the one or more proximate parked vehicles, according to one embodiment. The service providers and device manufacturers (e.g., wireless, cellular, etc.) are continually challenged to provide compelling network services that may include, optimizing the parking situation by helping the users in adjusting their vehicles to the most suitable parking position in order to avoid blocking of other parked vehicles by parking too close to one another. At present, users of the one or more parking vehicles have difficulty in finding a suitable parking position for their respective vehicles bearing in mind the other parked vehicles and the gaps those parked vehicles have around them.

Therefore, system 100 of FIG. 1 introduces the capability to provide the at least one device associated with the parking vehicle in finding a suitable parking adjustment based, at least in part, on the space needed by the nearby vehicles by establishing communication with the parked vehicles and retrieving their proximity information. Nowadays, most vehicles are equipped with one or more sensors which allow them to detect the orientation of other vehicles. Further, the sensors may provide one or more vehicles with dimension information and may assist with adjustment in parking position in an available parking space. In one scenario, at least one parking vehicle may reach a parking location whereby the at least one parking vehicle may find a parking space. Then, the one or more sensors of the at least one parking vehicles may communicate with the sensors of the one or more parked vehicles via the communication network 107, whereby the at least one parking vehicle may provide dimension information to the one or more parked vehicles, and the one or more parked vehicles may provide the at least one parking vehicle with parking space information. Subsequently, the adjustment platform 109 may process the gathered sensor information to determine an adjustment in the parking position.

As shown in FIG. 1, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to the adjustment platform 109 via the communication network 107. In one embodiment, the adjustment platform 109 performs one or more functions associated with causing an initiation of at least one communication session between at least one parking vehicle and one or more proximate parked vehicles to determine at least one measure of space associated with the one or more proximate parked vehicles to determine an adjustment of a parking position of the at least one parking vehicle relative to the one or more proximate parked vehicles.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.). In one embodiment, the UE 101 may be included within the one or more vehicles.

By way of example, the applications 103 may be any type of application that is executable at the UE 101, such as location-based service applications, social networking applications, media player applications, calendar applications, content provisioning services, navigation applications and the like. In one embodiment, the applications 103 may gather sensor information periodically and/or when needed. The data is collected from one or more parked vehicles, whereby the applications 103 may compute the gathered sensor information to determine a suitable parking position for the at least one parking vehicle. In one embodiment, the one or more vehicles may have cellular or WiFi connection either through the inbuilt communication equipment or from the UE 101 associated with the vehicles. The applications 103 may assist in conveying sensor information via the communication network 107.

By way of example, the sensors 105 may be any type of sensor. In certain embodiments, the sensors 105 may include, for example, a global positioning sensor for gathering location data, a network detection sensor for detecting wireless signals or network data, temporal information, a camera/imaging sensor for gathering image data, an audio recorder for gathering audio data, and the like. In one scenario, the sensors 105 may include location sensors (e.g., GPS), light sensors, oriental sensors augmented with height sensor and acceleration sensor, tilt sensors, moisture sensors, pressure sensors, audio sensors (e.g., microphone), or receivers for different short-range communications (e.g., Bluetooth, WiFi, near field communication etc.). It is contemplated that sensors 105 includes one or more components for determining gaps around one or more parked vehicles. In one embodiment, the sensors 105 may detect the status of parking space and transmits the information through the communication module 211. The sensors 105 may receive instructions from the adjustment platform 109 to carry out procedures such proximity information reporting, parking status reporting and so on. In one scenario, the sensors 105 may provide proximity information between one or more parked vehicles and/or the at least one parking vehicle based, at least in part, on the instruction provided by the adjustment platform 109.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the adjustment platform 109 may be a platform with multiple interconnected components. The adjustment platform 109 may include multiple servers, intelligent networking devices, computing devices, components and corresponding software for determining an adjustment in the position of the at least one parking vehicle. In addition, it is noted that the adjustment platform 109 may be a separate entity of the system 100, a part of the services 115 of the service platform 113, or included within the UE 101 (e.g., as part of the applications 103), or included within the one or more vehicles and/or autonomous vehicles, or included within an automatic parking system.

In one embodiment, the adjustment platform 109 causes an initiation of at least one communication session between at least one parking vehicle and one or more proximate parked vehicles. In another embodiment, the adjustment platform 109 may cause an establishment of communication session between at least one device associated with at least one parking vehicle and at least one other device associated with one or more parked vehicles. In one scenario, at least one parking vehicle may be driving down a parking facility in search of a suitable parking space. A pause in the vehicular movement in trying to fit the vehicle in an inappropriate parking space or in an inappropriate manner may obstruct the other parked vehicles and/or parking vehicles. Therefore, the one or more sensors of the at least one parking vehicle may directly communicate with the one or more sensors of the one or more parked vehicles in the parking facility to determine a suitable parking position. In another scenario, the UE 101 associated with the at least one parking vehicle may communicate with the UE 101 associated with the one or more parked vehicles to determine an adjustment in the parking position.

In one embodiment, the adjustment platform 109 determines at least one measure of space associated with the one or more proximate parked vehicles based, at least in part, on the at least one communication session. In one embodiment, the adjustment platform 109 causes an exchange of parking information over the communication session via one or more sensors, wherein parking information includes one or more dimensions of at least one parking vehicle, gaps between one or more parked vehicles, gaps around at least one parked vehicles, or a combination thereof. In one scenario, the sensors of the one or more parked vehicles may communicate with each other to determine any available parking space between them that suits the dimension information of the at least one parking vehicle. In one scenario, the at least one parking vehicle may be notified regarding the proximity with other parked vehicle at the time of parking.

In one embodiment, the adjustment platform 109 processes and/or facilitates the processing of the at least one measure of space to determine, at least in part, at least one adjustment of a parking position of the at least one parking vehicle relative to the one or more proximate parked vehicles. In one embodiment, the adjustment platform 109 causes a comparison between one or more dimensions of at least one parking vehicle, and the gaps between one or more parked vehicles. The adjustment platform 109 may cause a recommendation regarding at least one adjustment in the parking position for at least one parking vehicle based, at least in part, on the comparison.

In one embodiment, the database 111 may include parking information, sensor information, contextual information, or a combination thereof associated with one or more parked vehicles. By way of example, the adjustment platform 109 may use the parking information, sensor information, contextual information, or a combination thereof stored within the database 111 to determine an adjustment in the parking position for the at least one parking vehicle.

The services platform 113 may include any type of service. By way of example, the services platform 113 may include location based services, navigation services, mapping services, social networking services, content (e.g., audio, video, images, etc.) provisioning services, application services, storage services, contextual information determination services, etc. In one embodiment, the services platform 113 may interact with the UE 101, the adjustment platform 109 and the content providers 117 to supplement or aid in the processing of the content information.

By way of example, the services 115 may be an online service that reflects interests and/or activities of users. In one scenario, the services 115 may provide representations of each user (e.g., a profile), his/her social links, and a variety of additional information. The services 115 may assist in providing the adjustment platform 109 with location information, activities information, contextual information, of one or more users within their individual networks, and provides for data portability.

The content providers 117 may provide content to the UE 101, the adjustment platform 109, and the services 115 of the services platform 113. The content provided may be any type of content, such as textual content, audio content, video content, image content, etc. In one embodiment, the content providers 117 may provide content that may supplement content of the applications 103, the sensors 105, or a combination thereof. By way of example, the content providers 117 may provide content that may aid in determining an adjustment in the parking position for the at least one parking vehicle. In one embodiment, the content providers 117 may also store content associated with the UE 101, the adjustment platform 109, and the services 115 of the services platform 113. In another embodiment, the content providers 117 may manage access to a central repository of data, and offer a consistent, standard interface to data.

By way of example, the UE 101, the adjustment platform 109, the services platform 113, and the content providers 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
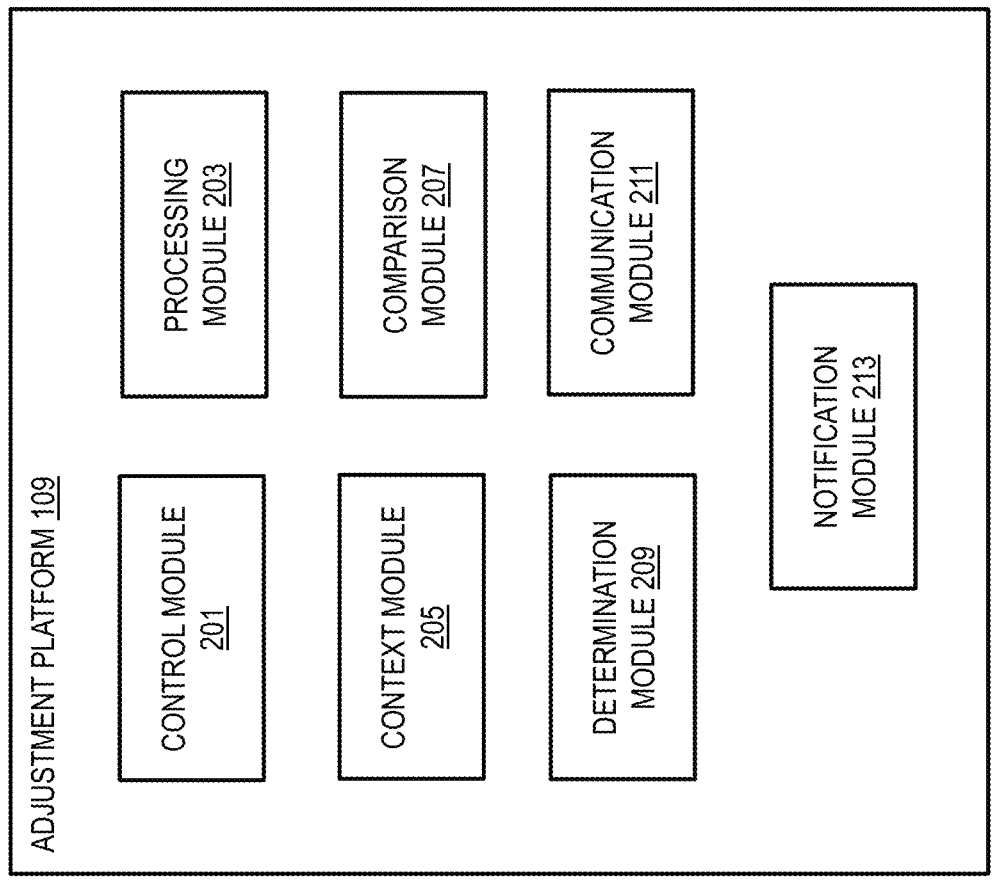
FIG. 2 is a diagram of the components of the adjustment platform 109, according to one embodiment.

FIG. 2 is a diagram of the components of the adjustment platform 109, according to one embodiment. By way of example, the adjustment platform 109 includes one or more components for causing an initiation of at least one communication session between at least one parking vehicle and one or more proximate parked vehicles to determine at least one measure of space associated with the one or more proximate parked vehicles to determine an adjustment of a parking position of the at least one parking vehicle relative to the one or more proximate parked vehicles. It is contemplated that the functions of these components may be combined in one or more components or performed by other components of equivalent functionality. In this embodiment, the adjustment platform 109 includes a control module 201, a context module 205, a processing module 203, a comparison module 207, a determination module 209, a communication module 211, and a notification module 213.

In one embodiment, the control module 201 executes at least one algorithm for executing functions of the adjustment platform 109. For example, the control module 201 may execute an algorithm for interacting with the processing module 203 for processing a query of the at least one parking vehicle for sensor related information associated with the one or more parked vehicle. By way of example, the control module 201 may execute an algorithm to interact with the context module 205 to determine the dimension information, temporal context, and other attributes of the one or more parked vehicles. By way of another example, the control module 201 may execute an algorithm to interact with the comparison module 207 to cause, at least in part, a comparison between one or more dimensions of the at least one parking vehicle with the one or more gaps between one or more parked vehicles. In another example, the control module 201 may execute an algorithm to interact with the determination module 209 to cause an initiation of a determination of the at least one adjustment, the activation of the one or more automatic movement systems, or a combination thereof based, at least in part, on the comparison. By way of example, the control module 201 may also execute an algorithm to interact with the communication module 211 to communicate among applications 103, the adjustment platform 109, the services platform 113, the content providers 117, and the database 111. By way of example, the control module 201 may further execute an algorithm to interact with the notification module 213 to cause a notification of gaps between at least one parking vehicle and one or more parked vehicles, based, at least in part, on proximity information.

In one embodiment, the processing module 203 may process and/or facilitate a processing of the parking information to determine gaps around one or more parked vehicles. In another embodiment, the processing module 203 may process and/or facilitate a processing of the parking information to determine gaps between at least one parking vehicle and the one or more parked vehicles. In one embodiment, the processing module 203 may cause a processing and/or facilitating the processing of parking information to cause, at least in part, an adjustment in the parking position of at least one parking vehicle.

In one embodiment, the context module 205 may determine dimension information, temporal context, user information, device information and other attributes associated with the at least one parking vehicle, one or more parked vehicles, or a combination thereof. In one embodiment, the context module 205 may utilize location-based technologies (e.g. sensors, GPS receivers etc.) to determine location information (e.g., direction, angles etc.), temporal information (e.g. departure time) during parking at the at least one parking space by the at least one parking vehicle. In one embodiment, the context module 205 may interact with the communication module 211 to determine device information (e.g. device capability information), user information (e.g. contextual information) to assist the adjustment platform 109 in determining a suitable parking position. In one embodiment, the context module 205 may determine to store the one or more sensor information, contextual information or a combination thereof within the database 111.

In one embodiment, the comparison module 207 may cause, at least in part, a comparison between the gaps of one or more parked vehicles. In another embodiment, the comparison module 207 may cause a comparison between one or more dimensions of the at least one parking vehicle with the gaps between one or more parked vehicles. In one embodiment, the comparison module 207 may co-ordinate with the determination module 209 to cause, at least in part, an initiation of the determination of the at least one adjustment, the activation of the one or more automatic movement systems, or a combination thereof based, at least in part, on the comparison. In another embodiment, the determination module 209 may determine at least one adjustment in the parking position for at least one parking vehicle based, at least in part, on maintaining one or more gaps between at least one parking vehicle and one or more parked vehicles, to enable one or more parked vehicles to leave a parking space.

In one embodiment, the communication module 211 is used for communication between the applications 103, the sensors 105, the adjustment platform 109, the services platform 113, the content providers 117, and the database 111. The communication module 211 may be used to communicate commands, requests, data, etc. By way of example, the communication module 211 may be used to transit a request from at least one device associated with the at least one parking vehicle to obtain parking related information (e.g., sensor information, departure time information, contextual information etc.) for one or more parked vehicles. In one embodiment, the communication module 211 establishes a communication session among one or more vehicles associated with at least one parking location for querying one or more parking related information.

In one embodiment, the notification module 213 may work with the communication module 211 to cause a transmission of sensor related information and parking status information to the at least one parking vehicle and/or device associated with the at least one parking vehicle. In another embodiment, the notification module 213 may alert the users of the at least one parking vehicles regarding the one or more gaps between the at least one parking vehicle and the one or more parked vehicles, the at least one potential conflict, or a combination thereof.

Figure 3:
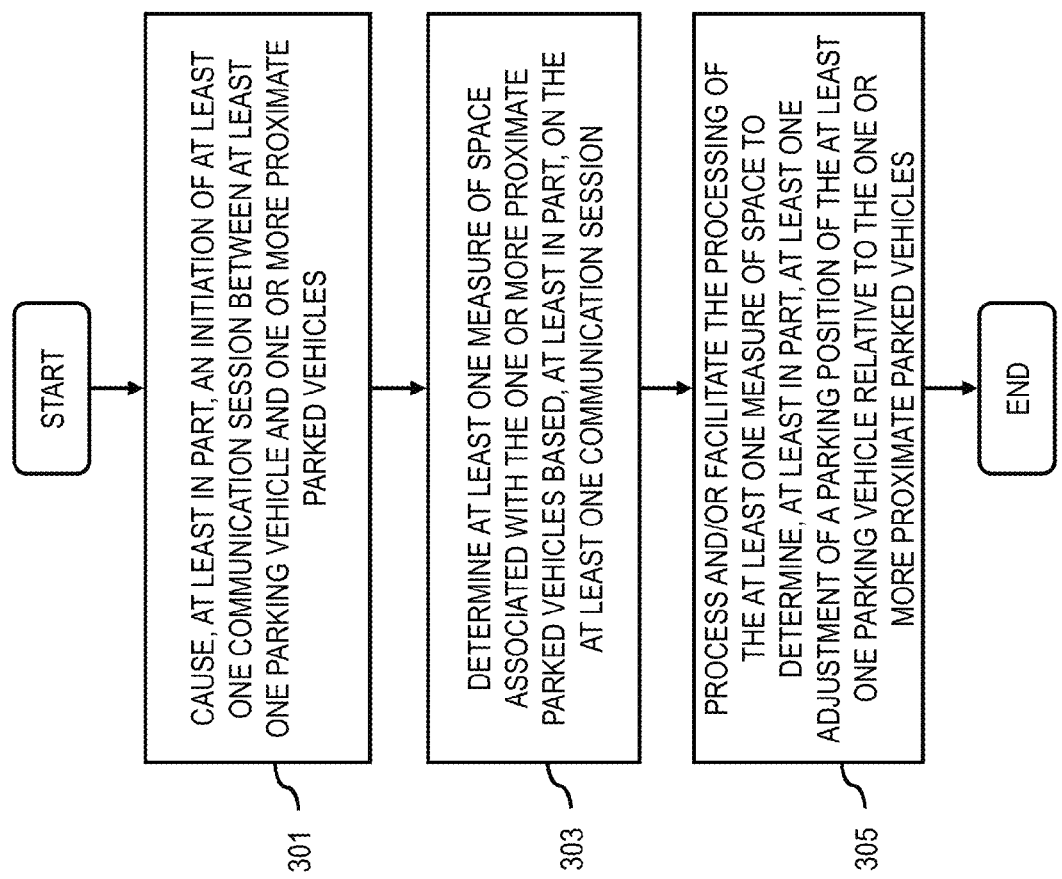
FIG. 3 is a flowchart of a process for causing an adjustment of a parking position of the at least one parking vehicle based, at least in part, on the measure of space associated with the one or more proximate parked vehicles, according to one embodiment.
Figure 13:
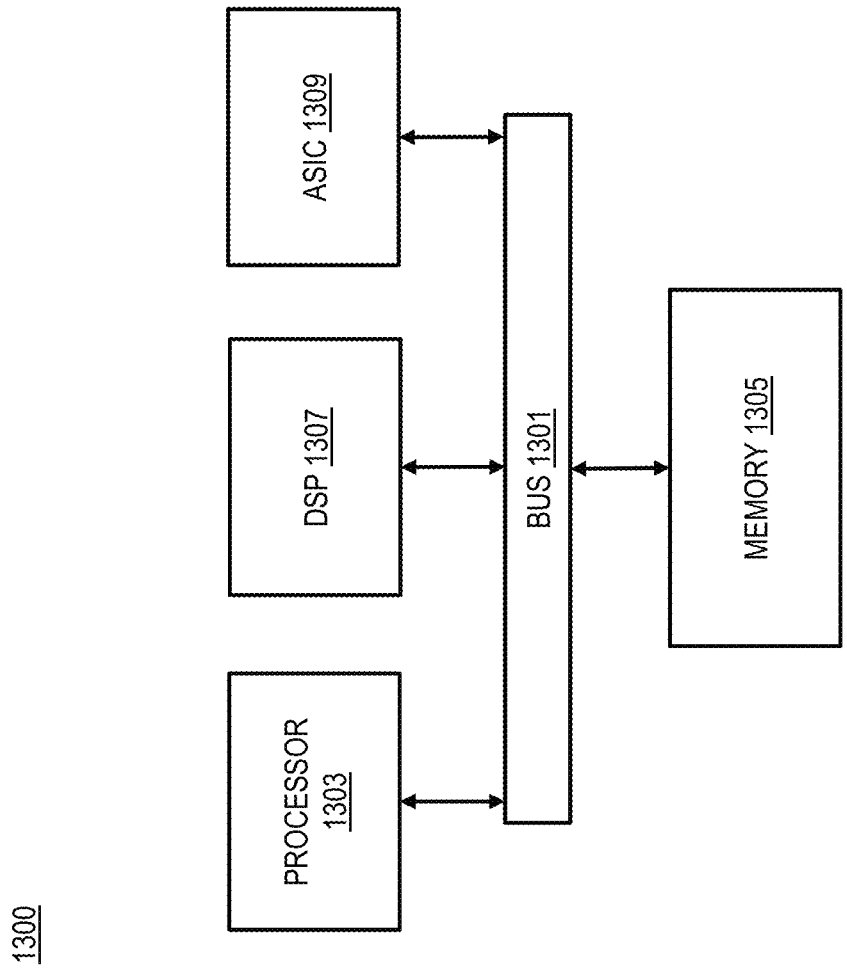
FIG. 13 is a diagram of a chip set that can be used to implement an embodiment of the invention.

FIG. 3 is a flowchart of a process for causing an adjustment of a parking position of the at least one parking vehicle based, at least in part, on the measure of space associated with the one or more proximate parked vehicles, according to one embodiment. In one embodiment, the adjustment platform 109 performs the process 300 and is implemented in, for instance, a chip set including a processor and a memory as shown in FIG. 13.

In step 301, the adjustment platform 109 causes, at least in part, an initiation of at least one communication session between at least one parking vehicle and one or more proximate parked vehicles. In one embodiment, the sensors of the one or more parked vehicles, the at least one parking vehicles, or a combination thereof, may communicate over the communication network 107 to determine the gaps around the one or more parked vehicles. In another embodiment, the UE 101 associated with the one or more parked vehicles, the at least one parking vehicles, or a combination thereof may communicate over the communication network 107 to determine the gaps around the one or more parked vehicles.

In step 303, the adjustment platform 109 determines at least one measure of space associated with the one or more proximate parked vehicles based, at least in part, on the at least one communication session. In one scenario, the sensors of the one or more parked vehicles may provide the at least one parking vehicle with the space information around them, and the at least one parking vehicle may provide the one or more parked vehicles with its dimension information. Such exchange of parking information over the communication session via one or more sensors may trigger the adjustment platform 109 to cause a comparison between the dimensions of at least one parking vehicle with the gaps of the one or more parked vehicles.

In step 305, the adjustment platform 109 processes and/or facilitates the processing of the at least one measure of space to determine, at least in part, at least one adjustment of a parking position of the at least one parking vehicle relative to the one or more proximate parked vehicles, wherein the at least one measure of space includes, at least in part, one or more distances in front and/or behind the one or more proximate parked vehicles, one or more distances on the right and/or left of the one or more proximate parked vehicles, or a combination thereof. In one embodiment, the at least one adjustment of the parking position is based, at least in part, on one or more manual adjustments, one or more automated adjustments, or a combination thereof associated with the at least one parking vehicle. In one scenario, the one or more vehicles may communicate with each other and share parking space information. The adjustment platform 109 may be provided with proximity information which may include space around the one or more parked vehicles, length and width of the at least one parking vehicle, the turning radius information for one or more parked vehicles etc. Subsequently, the adjustment platform 109 causes at least in part an adjustment in the parking position of the at least one parking vehicle based, at least in part, on the input from one or more sensors. In one scenario, the user of the at least one parking vehicle may adjust the parking position himself/herself based, at least in part, on the instruction information provided by the adjustment platform 109.

Figure 4:
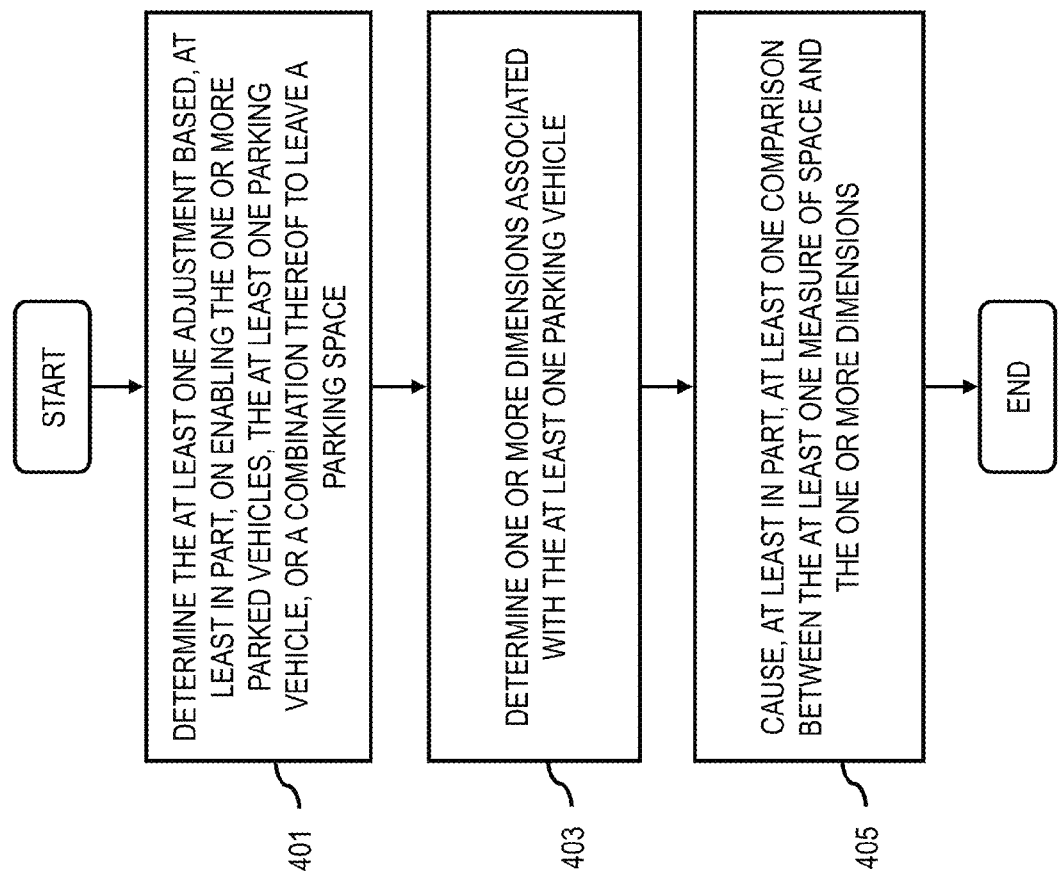
FIG. 4 is a flowchart of a process for comparing the at least one measure of space and the one or more dimensions to cause an adjustment in a parking position to enable the one or more parked vehicles to leave a parking space, according to one embodiment.

FIG. 4 is a flowchart of a process for comparing the at least one measure of space and the one or more dimensions to cause an adjustment in a parking position to enable the one or more parked vehicles to leave a parking space, according to one embodiment. In one embodiment, the adjustment platform 109 performs the process 400 and is implemented in, for instance, a chip set including a processor and a memory as shown in FIG. 13.

In step 401, the adjustment platform 109 determines the at least one adjustment based, at least in part, on enabling the one or more parked vehicles, the at least one parking vehicle, or a combination thereof to leave a parking space. In one scenario, the adjustment platform 109 processes and/or facilitates a processing of the parking information to determine an adjustment in the parking position for at least one parking vehicle based, at least in part, on maintaining sufficient space between at least one parking vehicle and one or more parked vehicles, to enable one or more parked vehicles to leave a parking space. In one scenario, a parking space may be 4 meters in length and width, and the at least one parking vehicle may have a dimension of 3 meters, thereby enabling the parking vehicle to leave a space of 50 cm around it. However, leaving a 50 cm space might not be enough for one or more nearby parked vehicle to leave the parking location. Therefore, the adjustment platform 109 may take into consideration the dimensions of the nearby parked vehicle, the area around the nearby parked vehicle and the area that is needed to be maintained around the nearby parked vehicle to depart the parking area without obstruction. Subsequently, the adjustment platform 109 may instruct the parking vehicle to adjust the parking position accordingly.

In step 403, the adjustment platform 109 determines one or more dimensions associated with the at least one parking vehicle. In one embodiment, the one or more dimensions of the at least one parking vehicle includes the length, the breadth, the turning radius, or a combination thereof. In one scenario, the adjustment platform 109 may consider the models of the one or more parked vehicles and/or the at least one parking vehicles to determine their dimension information.

In step 405, the adjustment platform 109 causes, at least in part, at least one comparison between the at least one measure of space and the one or more dimensions, wherein the at least one adjustment is based, at least in part, on the comparison. In one scenario, the adjustment platform 109 causes a comparison between the dimensions of the at least one parking vehicle and the gaps between one or more parked vehicles. Then, the adjustment platform 109 may cause a recommendation on the adjustment in the parking position for the at least on parking vehicle.

Figure 5:
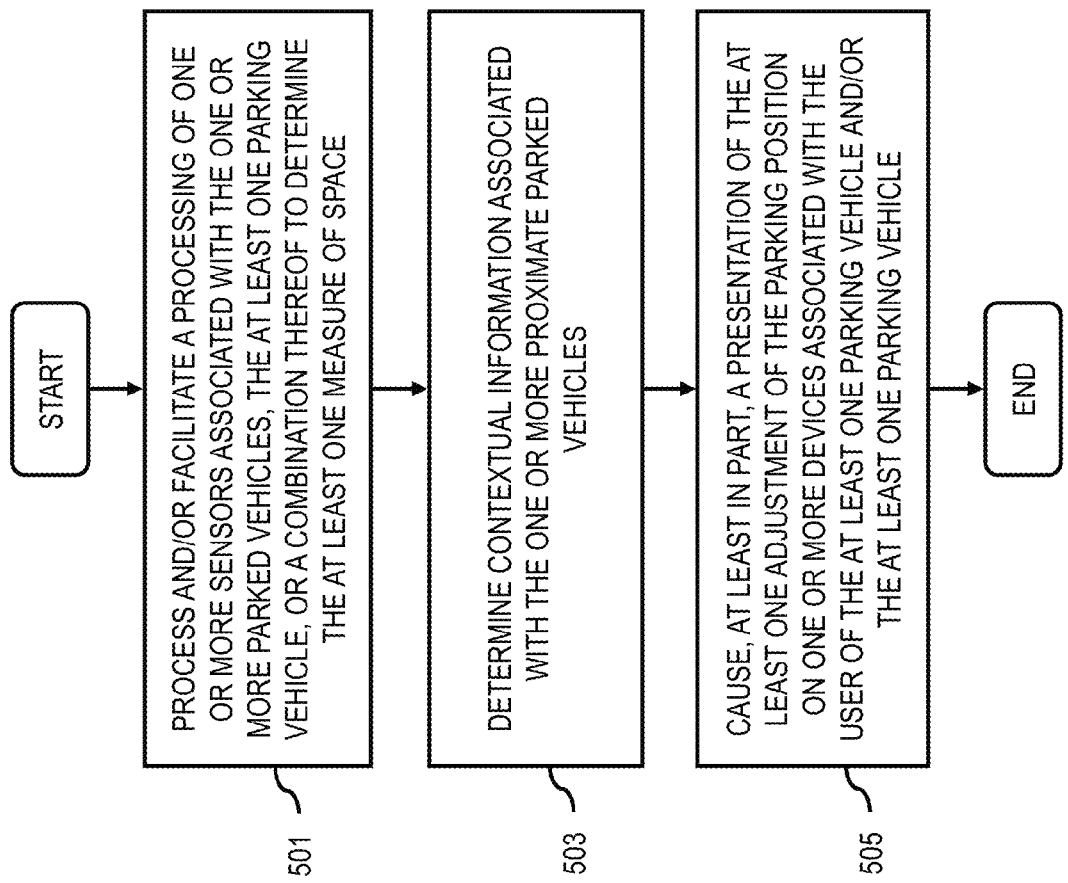
FIG. 5 is a flowchart of a process for causing a presentation of the at least one adjustment and/or contextual information of proximate parked vehicles on at least one device associated with the at least one parking vehicle, according to one embodiment.

FIG. 5 is a flowchart for causing a presentation of the at least one adjustment and/or contextual information of proximate parked vehicles on at least one device associated with the at least one parking vehicle, according to one embodiment. In one embodiment, the adjustment platform 109 performs the process 500 and is implemented in, for instance, a chip set including a processor and a memory as shown in FIG. 13.

In step 501, the adjustment platform 109 processes and/or facilitates a processing of one or more sensors associated with the one or more parked vehicles, the at least one parking vehicle, or a combination thereof to determine the at least one measure of space.

In step 503, the adjustment platform 109 determines contextual information associated with the one or more proximate parked vehicles, wherein the at least one adjustment is further based, at least in part, on the contextual information. In one scenario, the user of the at least one parking vehicle may receive contextual information on the user of proximate parked vehicles. The user of the at least one parking vehicle may recognize the user of the proximate parked vehicle as a friend, whereby the user may prioritize the adjustment in the parking position accordingly. In one scenario, the user of the at least one parking vehicle may communicate with the identified user of the parked vehicle and may seek their permission to instruct their respective parked vehicle to adjust in parking position.

In step 505, the adjustment platform 109 causes, at least in part, a presentation of the at least one adjustment of the parking position on one or more devices associated with the user of the at least one parking vehicle, the at least one parking vehicle, or a combination thereof. In one embodiment, the presentation includes, at least in part, one or more indicators, one or more messages, one or more alerts, or a combination thereof. In one embodiment, the one or more indicators may include inter vehicle positioning instructions.

Figure 6:
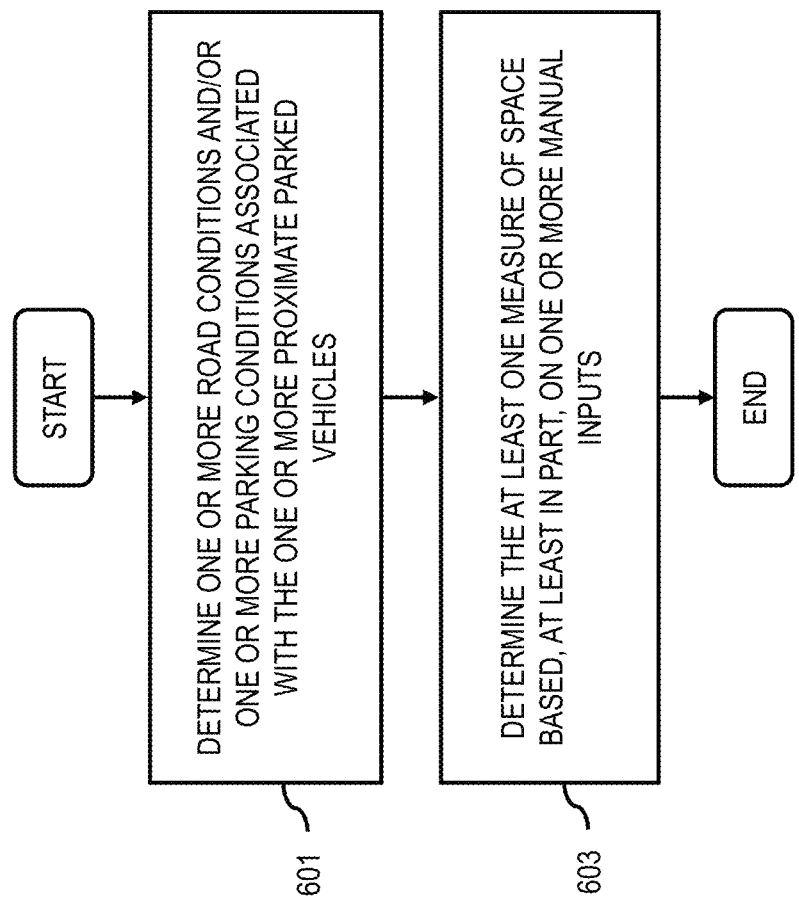
FIG. 6 is a flowchart of a process for causing an adjustment of the parking position based, at least in part, on the one or more road conditions and/or the one or more parking conditions, according to one embodiment.

FIG. 6 is a flowchart of a process for causing an adjustment of the parking position based, at least in part, on the one or more road conditions and/or the one or more parking conditions, according to one embodiment. In one embodiment, the adjustment platform 109 performs the process 600 and is implemented in, for instance, a chip set including a processor and a memory as shown in FIG. 13.

In step 601, the adjustment platform 109 determines one or more road conditions, one or more parking conditions, or a combination thereof associated with the one or more proximate parked vehicles, wherein the at least one adjustment of the parking position is further based, at least in part, on the one or more road conditions, the one or more parking conditions, or a combination thereof. In one scenario, the adjustment platform 109 may cause an adjustment in the parking position based, at least in part, on the dimensions of the parking area. In one scenario, the adjustment platform 109 may take into consideration the inclination and/or the curve of the one or more streets where the at least one vehicle is parked. In one scenario, the one or more sensors in the vehicles can detect the conditions of the parking area, such information may be transmitted to the adjustment platform 109 to make a determination in the adjustment of the parking position. In one scenario, the adjustment platform 109 may consider the geometry of the parking lanes to make a determination in adjusting the parking position for the at least one parking vehicle. In one scenario, the sensors of the at least one parking vehicle may detect one or more parking lines, whereby the adjustment platform 109 may adjust the parking position of the at least one parking vehicle within the parking lines. In another scenario, the sensors of the at least one parking vehicles may detect one or more objects that prevents the vehicle from parking in a particular parking area (for e.g., a fire hydrant), the adjustment platform 109 may consider such deterrents while adjusting the parking position for the at least one parking vehicles.

In step 603, the adjustment platform 109 determines the at least one measure of space based, at least in part, on one or more manual inputs. In one scenario, the at least one parking vehicle, one or more parked vehicles, or a combination thereof, may not be a smart vehicle with no sensors embedded in them. In such scenarios, the one or more users of the one or more parked vehicles may guess the gaps around their parked vehicles and feed the information to the adjustment platform 109 via their respective UE 101. Subsequently, the adjustment platform 109 in the UE 101 associated with the at least one parking vehicle may provide the user of the parking vehicle with adjustment instructions based on the input.

Figure 7:
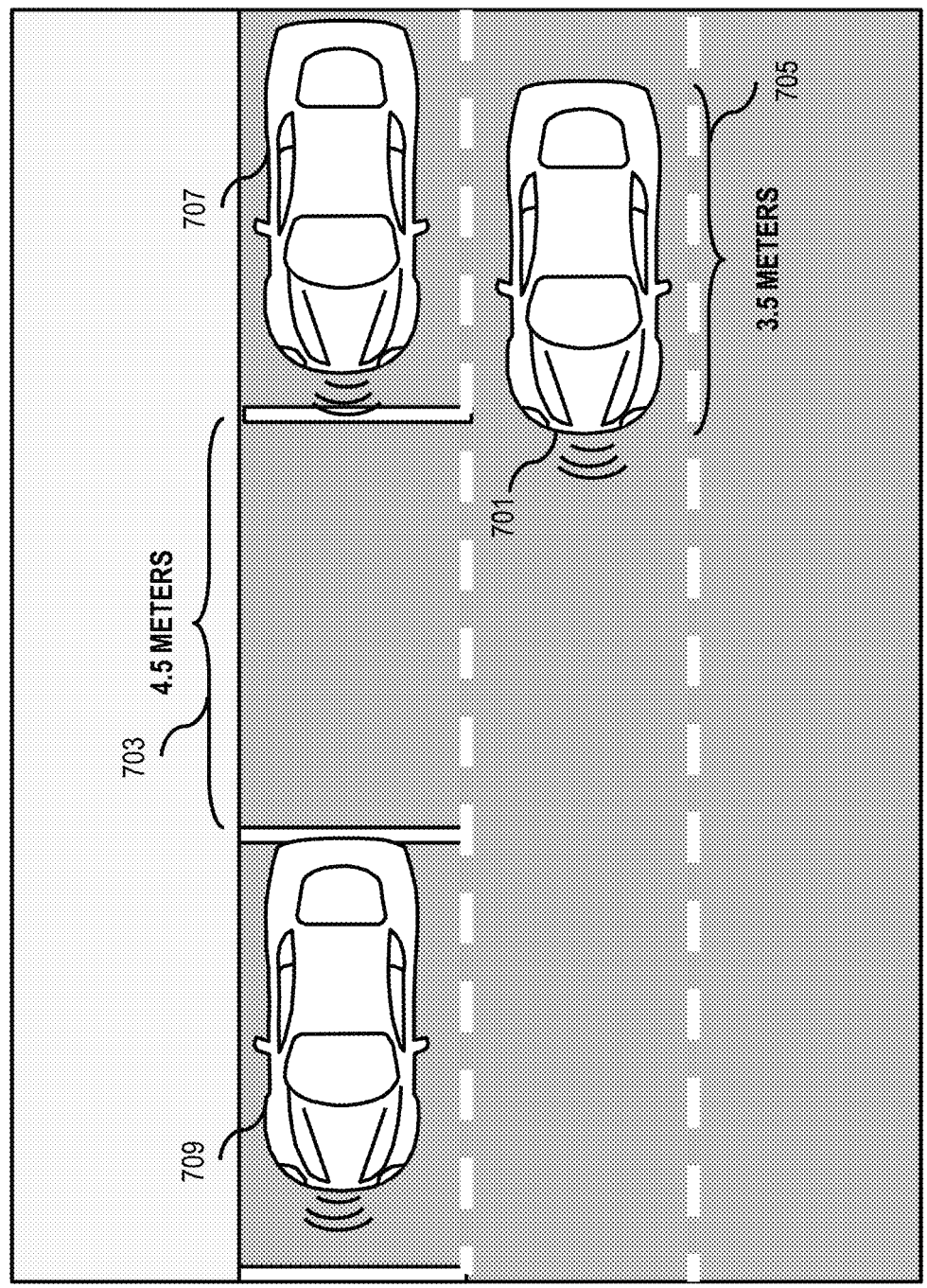
FIG. 7-11 are diagrams of user interfaces utilized in the processes of FIGS. 3-6, according to one embodiment.

FIG. 7 is a diagram of a user interface utilized in the processes of FIGS. 3-6, according to one embodiment. In one scenario, the at least one parking vehicle may communicate with the one or more parked vehicles to share parking related information, for instance, the gaps required to be maintained between the parked vehicles to ensure other parked and/or parking vehicles are not blocked. In one scenario, the at least one parking vehicle may adjust his/her parking position based, at least in part, on the parking related information. In one scenario, at least one parking vehicle (701) may park in a parking area (703) which is 4.5 meter in length. The parking vehicle (701) may be 3.5 meters long (705), as a result the parking vehicle 701 is able to park in the parking area 703 in an appropriate manner. However, the parking vehicle (701) may take into consideration the parking situation of the nearby parked vehicles (709, 707) to adjust its parking position. For instance, if the parking vehicle (701) parks in a manner whereby it leaves a gap of 0.5 meter on each side it might block one of the parked vehicles (707) because it does not have sufficient gaps around it, therefore, parking vehicle (701) may take into consideration the gaps around parked vehicle 709 to adjust its parking position in a manner that is suitable for nearby parked vehicles.

Figure 8:
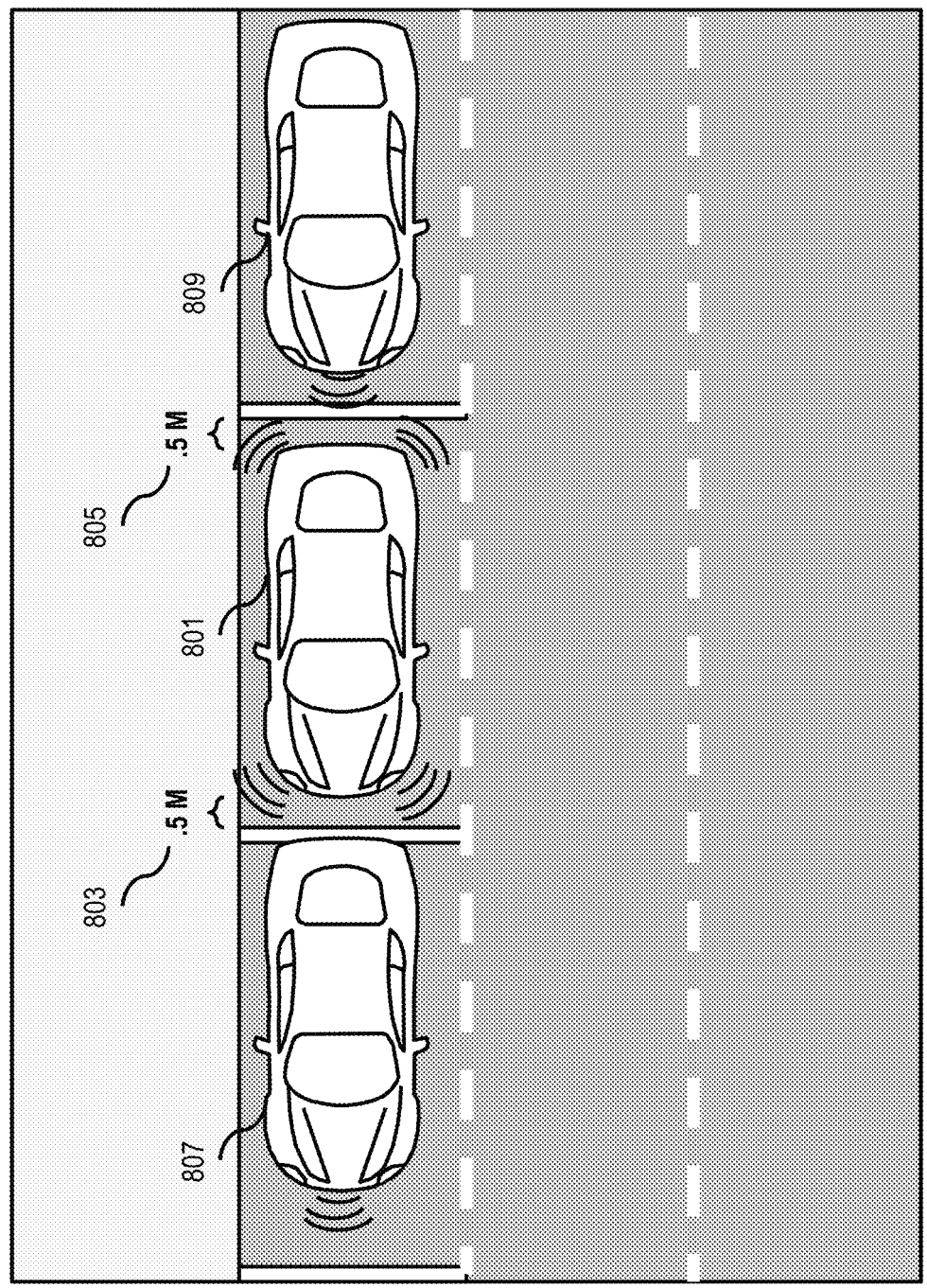

FIG. 8 is a diagram of a user interface utilized in the processes of FIGS. 3-6, according to one embodiment. In one scenario, the at least one parking vehicle (801) may park in the parking area whereby the parking vehicle (801) may leave a gap of 0.5 meter on each side (803, 805). However, the parking vehicle 801 upon communicating with the one or more parked vehicles (807, 809) may determine that the parked vehicle 807 has more gaps around it than parked vehicle 809. Therefore, the parking vehicle 801 may adjust its parking position based, at least in part, on the communication ensuring that it leaves more space with the parked vehicle 809 than with the parked vehicle 807.

Figure 9:
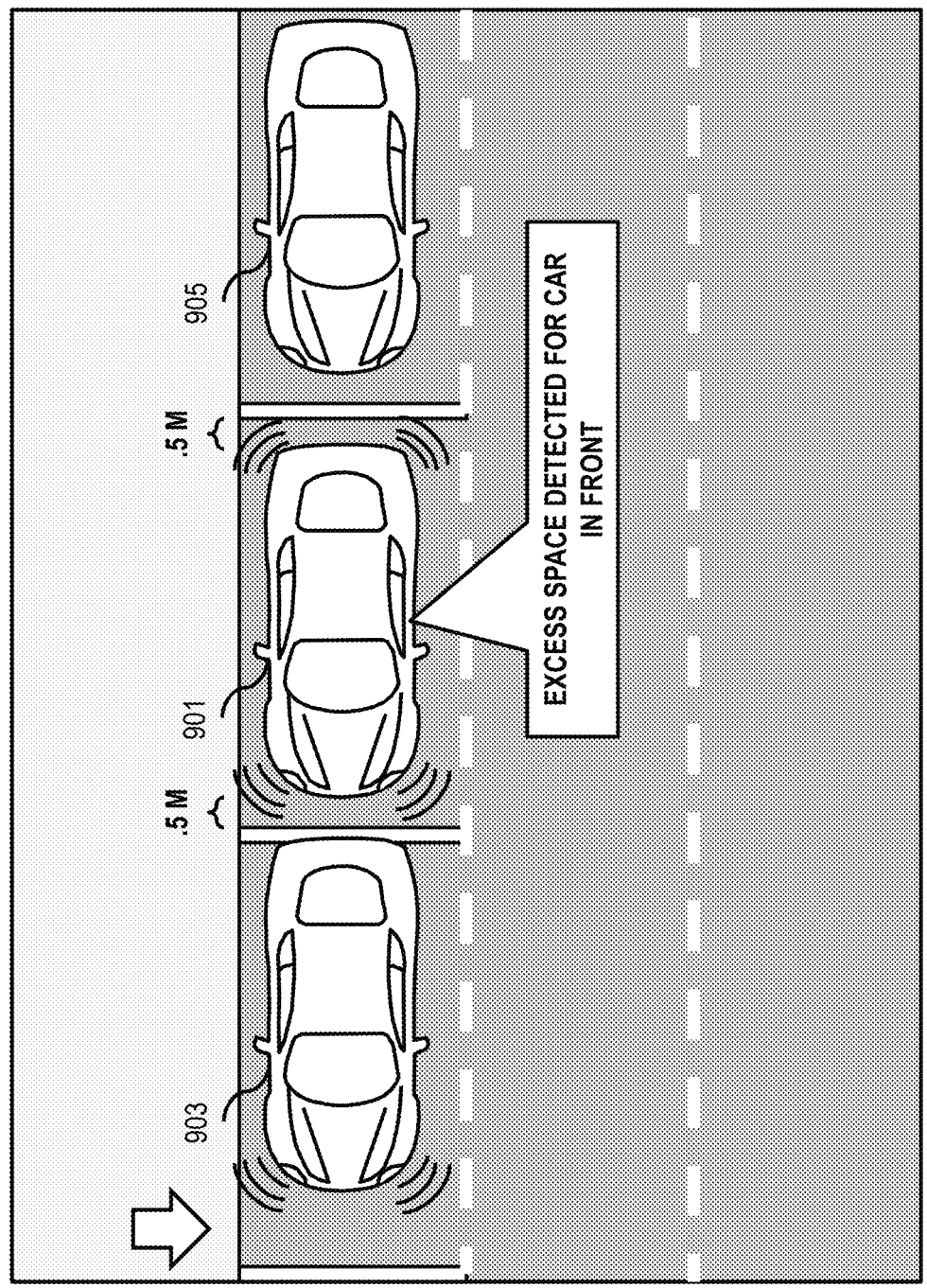

FIG. 9 is a diagram of a user interface utilized in the processes of FIGS. 3-6, according to one embodiment. In one scenario, the at least one parking vehicle 901 may communicate with the parked vehicles 903 and 905 to detect gaps around the parked vehicles 903 and 905. The parking vehicle 901 may detect excess gaps around parked vehicle 903 and may compare the gaps with the gaps around parked vehicle 905. Further, the parking vehicle may compare the dimensions of the one or more parked vehicles with the gaps around them. In one scenario, the adjustment platform 109 may determine that the parked vehicle 903 has excess space around it based, at least in part, on the comparison. Subsequently, the parking vehicle 901 may park closer to the parked vehicle 903 and farther from the parked vehicle 905.

Figure 10:
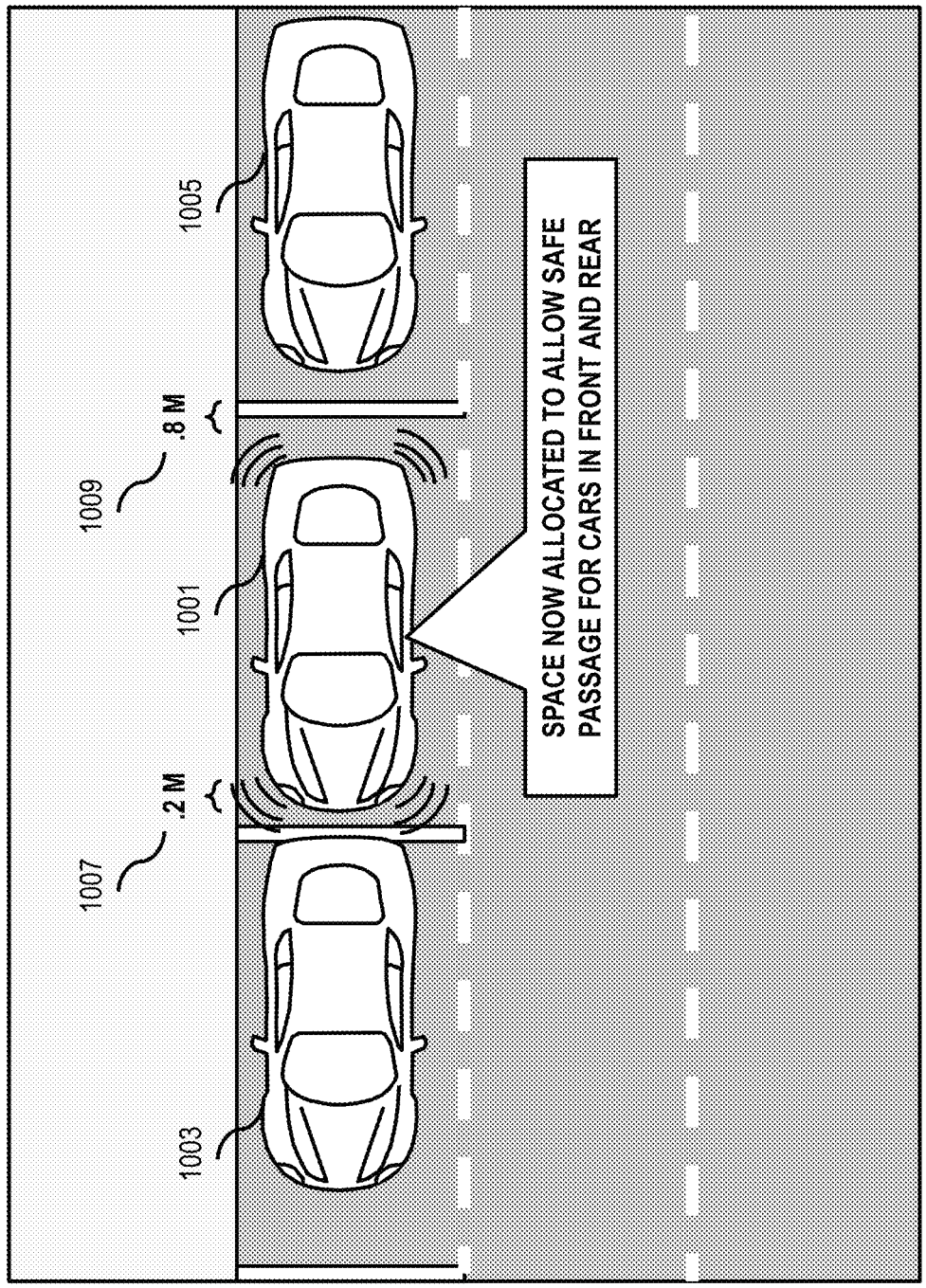

FIG. 10 is a diagram of a user interface utilized in the processes of FIGS. 3-6, according to one embodiment. In one scenario, the parking vehicle 1001 may park 0.2 meter behind the parked vehicle in the front 1003, thereby leaving a gap of 0.8 m with the vehicle parked in the back (1005). The parking vehicle 1001 may make such determination based, at least in part, on the parking information received from the sensors of the one or more parked vehicles (1003, 1005). In one scenario, the at least one parking vehicle 1001 may be informed that the vehicle parked in the front (1003) has enough space ahead to depart the parking location without being blocked even if the parking vehicle 1001 parks within a gap of 0.2 meters (1007). On the other hand, the vehicle parked behind (1005) the parking vehicle (1001) does not have enough space therefore the parking vehicle (1001) must leave a gap of at least 0.8 meter (1009) to ensure that the vehicle parked behind (1005) is not obstructed by the parking vehicle 1001. In such manner, the parking situations are optimized as the vehicles may auto regulate the parking space they need thereby reducing the wasting of parking spaces. Such organized parking may prevent one or more vehicles from being damaged during a minor collision between a departing vehicles and the at least one parked vehicle. In one scenario, if the at least one nearby parked vehicle leaves the parking location, the adjustment platform 109 may cause the other parked vehicles to readjust their parking position based, at least in part, on the notification from one or more sensors regarding departure of the at least one nearby parked vehicle. In one example embodiment, vehicle 1005 departs the parking area whereby the sensors associated with the vehicles 1005 and/or 1001 may notify the adjustment platform 109 associated with the vehicle 1001. Subsequently, the adjustment platform 109 may readjust the position of vehicle 1001 to 0.5 meter on each side. The adjustment platform 109 may cause such rearrangement in the parking position based on the new context of the parking situation because the previous adjustments between the vehicles may not be valid upon departure of the at least one nearby parked vehicle.

Figure 11:
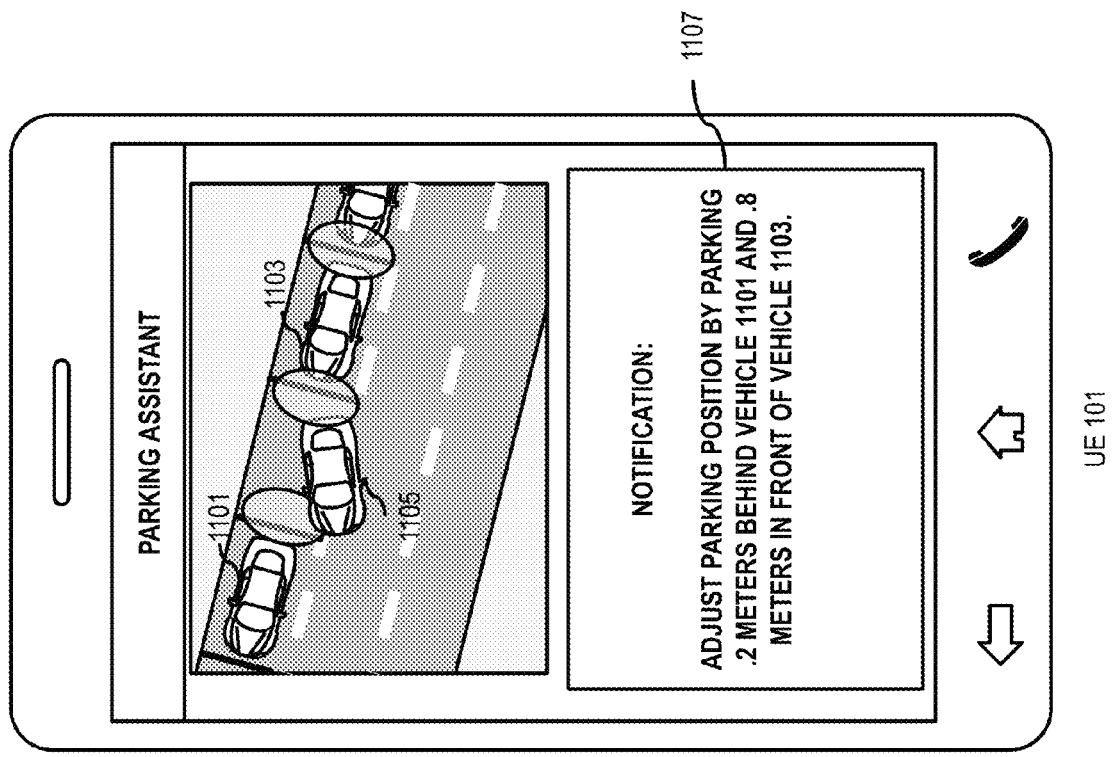

FIG. 11 is a diagram of a user interface utilized in the processes of FIGS. 3-6, according to one embodiment. In one scenario, the adjustment platform 109 may cause at least in part, a presentation of a user interface comprising one or more indicators, one or more messages, or a combination thereof for providing instructing information, status information, or a combination thereof on the parking information. In one scenario, the one or more indicators includes inter vehicle positioning instructions. In one scenario, the parking vehicle 1105 may communicate with the parked vehicle 1101 and 1103 regarding the gaps around them. The user of the at least one device associated with the parking vehicle 1105 may receive a notification of gaps between at least one parking vehicle and one or more parked vehicles, based, at least in part, on proximity information. In one scenario, the user of the parking vehicle 1105 may decide to park with the gap of 0.5 meter on each side whereupon the user may be notified in his/her UE 101 that the user must adjust the parking position for his/her vehicle by parking 0.2 meters behind vehicle 1101 and 0.8 meters in front of vehicle 1103 (1107).

The processes described herein for causing an initiation of at least one communication session between at least one parking vehicle and one or more proximate parked vehicles to determine at least one measure of space associated with the one or more proximate parked vehicles to determine an adjustment of a parking position of the at least one parking vehicle relative to the one or more proximate parked vehicles may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 12:
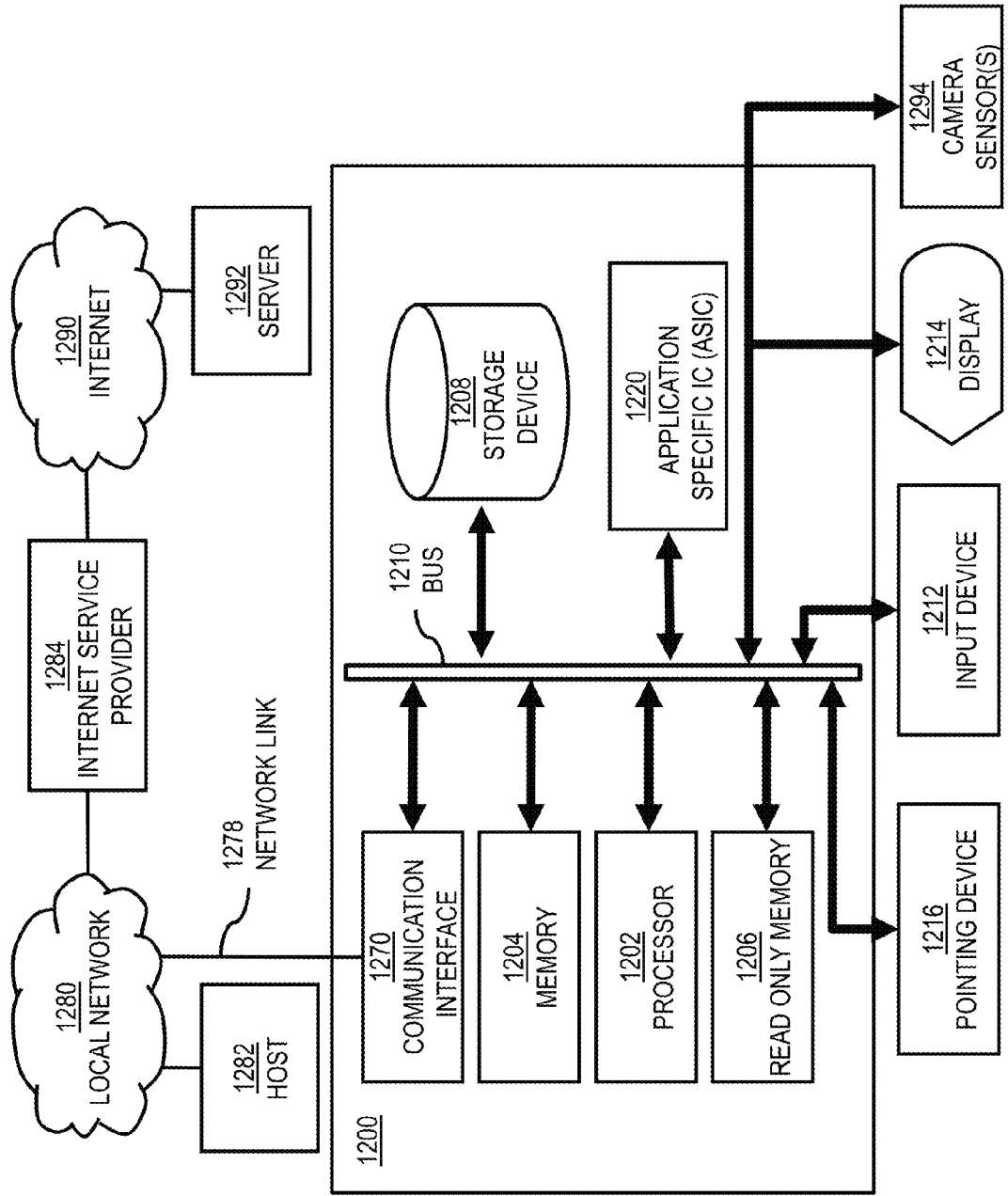
FIG. 12 is a diagram of hardware that can be used to implement an embodiment of the invention.

FIG. 12 illustrates a computer system 1200 upon which an embodiment of the invention may be implemented. Although computer system 1200 is depicted with respect to a particular device or equipment, it is contemplated that other devices or equipment (e.g., network elements, servers, etc.) within FIG. 12 can deploy the illustrated hardware and components of system 1200. Computer system 1200 is programmed (e.g., via computer program code or instructions) to cause an initiation of at least one communication session between at least one parking vehicle and one or more proximate parked vehicles to determine at least one measure of space associated with the one or more proximate parked vehicles to determine an adjustment of a parking position of the at least one parking vehicle relative to the one or more proximate parked vehicles as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1200, or a portion thereof, constitutes a means for performing one or more steps of causing an initiation of at least one communication session between at least one parking vehicle and one or more proximate parked vehicles to determine at least one measure of space associated with the one or more proximate parked vehicles to determine an adjustment of a parking position of the at least one parking vehicle relative to the one or more proximate parked vehicles.

A bus 1210 includes one or more parallel conductors of information so that information is transferred quickly among devices coupled to the bus 1210. One or more processors 1202 for processing information are coupled with the bus 1210.

A processor (or multiple processors) 1202 performs a set of operations on information as specified by computer program code related to cause an initiation of at least one communication session between at least one parking vehicle and one or more proximate parked vehicles to determine at least one measure of space associated with the one or more proximate parked vehicles to determine an adjustment of a parking position of the at least one parking vehicle relative to the one or more proximate parked vehicles. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1200 also includes a memory 1204 coupled to bus 1210. The memory 1204, such as a random access memory (RAM) or any other dynamic storage device, stores information including processor instructions for causing an initiation of at least one communication session between at least one parking vehicle and one or more proximate parked vehicles to determine at least one measure of space associated with the one or more proximate parked vehicles to determine an adjustment of a parking position of the at least one parking vehicle relative to the one or more proximate parked vehicles. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or any other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for causing an initiation of at least one communication session between at least one parking vehicle and one or more proximate parked vehicles to determine at least one measure of space associated with the one or more proximate parked vehicles to determine an adjustment of a parking position of the at least one parking vehicle relative to the one or more proximate parked vehicles, is provided to the bus 1210 for use by the processor from an external input device 1212, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT), a liquid crystal display (LCD), a light emitting diode (LED) display, an organic LED (OLED) display, a plasma screen, or a printer for presenting text or images, and a pointing device 1216, such as a mouse, a trackball, cursor direction keys, or a motion sensor, for controlling a position of a small cursor image presented on the display 1214 and issuing commands associated with graphical elements presented on the display 1214, and one or more camera sensors 1294 for capturing, recording and causing to store one or more still and/or moving images (e.g., videos, movies, etc.) which also may comprise audio recordings. In some embodiments, for example, in embodiments in which the computer system 1200 performs all functions automatically without human input, one or more of external input device 1212, display device 1214 and pointing device 1216 may be omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of ASICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 107 for causing an initiation of at least one communication session between at least one parking vehicle and one or more proximate parked vehicles to determine at least one measure of space associated with the one or more proximate parked vehicles to determine an adjustment of a parking position of the at least one parking vehicle relative to the one or more proximate parked vehicles to the UE 101.

The term "computer-readable medium" as used herein refers to any medium that participates in providing information to processor 1202, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1208. Volatile media include, for example, dynamic memory 1204. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1220.

Network link 1278 typically provides information communication using transmission media through one or more networks to other devices that use or process the information. For example, network link 1278 may provide a connection through local network 1280 to a host computer 1282 or to equipment 1284 operated by an Internet Service Provider (ISP). ISP equipment 1284 in turn provides data communication services through the public, world-wide packet-switching communication network of networks now commonly referred to as the Internet 1290.

A computer called a server host 1292 connected to the Internet hosts a process that provides a service in response to information received over the Internet. For example, server host 1292 hosts a process that provides information representing video data for presentation at display 1214. It is contemplated that the components of system 1200 can be deployed in various configurations within other computer systems, e.g., host 1282 and server 1292.

At least some embodiments of the invention are related to the use of computer system 1200 for implementing some or all of the techniques described herein. According to one embodiment of the invention, those techniques are performed by computer system 1200 in response to processor 1202 executing one or more sequences of one or more processor instructions contained in memory 1204. Such instructions, also called computer instructions, software and program code, may be read into memory 1204 from another computer-readable medium such as storage device 1208 or network link 1278. Execution of the sequences of instructions contained in memory 1204 causes processor 1202 to perform one or more of the method steps described herein. In alternative embodiments, hardware, such as ASIC 1220, may be used in place of or in combination with software to implement the invention. Thus, embodiments of the invention are not limited to any specific combination of hardware and software, unless otherwise explicitly stated herein.

The signals transmitted over network link 1278 and other networks through communications interface 1270, carry information to and from computer system 1200. Computer system 1200 can send and receive information, including program code, through the networks 1280, 1290 among others, through network link 1278 and communications interface 1270. In an example using the Internet 1290, a server host 1292 transmits program code for a particular application, requested by a message sent from computer 1200, through Internet 1290, ISP equipment 1284, local network 1280 and communications interface 1270. The received code may be executed by processor 1202 as it is received, or may be stored in memory 1204 or in storage device 1208 or any other non-volatile storage for later execution, or both. In this manner, computer system 1200 may obtain application program code in the form of signals on a carrier wave.

Various forms of computer readable media may be involved in carrying one or more sequence of instructions or data or both to processor 1202 for execution. For example, instructions and data may initially be carried on a magnetic disk of a remote computer such as host 1282. The remote computer loads the instructions and data into its dynamic memory and sends the instructions and data over a telephone line using a modem. A modem local to the computer system 1200 receives the instructions and data on a telephone line and uses an infra-red transmitter to convert the instructions and data to a signal on an infra-red carrier wave serving as the network link 1278. An infrared detector serving as communications interface 1270 receives the instructions and data carried in the infrared signal and places information representing the instructions and data onto bus 1210. Bus 1210 carries the information to memory 1204 from which processor 1202 retrieves and executes the instructions using some of the data sent with the instructions. The instructions and data received in memory 1204 may optionally be stored on storage device 1208, either before or after execution by the processor 1202.

FIG. 13 illustrates a chip set or chip 1300 upon which an embodiment of the invention may be implemented. Chip set 1300 is programmed to cause an initiation of at least one communication session between at least one parking vehicle and one or more proximate parked vehicles to determine at least one measure of space associated with the one or more proximate parked vehicles to determine an adjustment of a parking position of the at least one parking vehicle relative to the one or more proximate parked vehicles as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1300 can be implemented in a single chip. It is further contemplated that in certain embodiments the chip set or chip 1300 can be implemented as a single "system on a chip." It is further contemplated that in certain embodiments a separate ASIC would not be used, for example, and that all relevant functions as disclosed herein would be performed by a processor or processors. Chip set or chip 1300, or a portion thereof, constitutes a means for performing one or more steps of providing user interface navigation information associated with the availability of functions. Chip set or chip 1300, or a portion thereof, constitutes a means for performing one or more steps of causing an initiation of at least one communication session between at least one parking vehicle and one or more proximate parked vehicles to determine at least one measure of space associated with the one or more proximate parked vehicles to determine an adjustment of a parking position of the at least one parking vehicle relative to the one or more proximate parked vehicles.

In one embodiment, the chip set or chip 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1300 includes merely one or more processors and some software and/or firmware supporting and/or relating to and/or for the one or more processors.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to cause an initiation of at least one communication session between at least one parking vehicle and one or more proximate parked vehicles to determine at least one measure of space associated with the one or more proximate parked vehicles to determine an adjustment of a parking position of the at least one parking vehicle relative to the one or more proximate parked vehicles. The memory 1305 also stores the data associated with or generated by the execution of the inventive steps.

Figure 14:
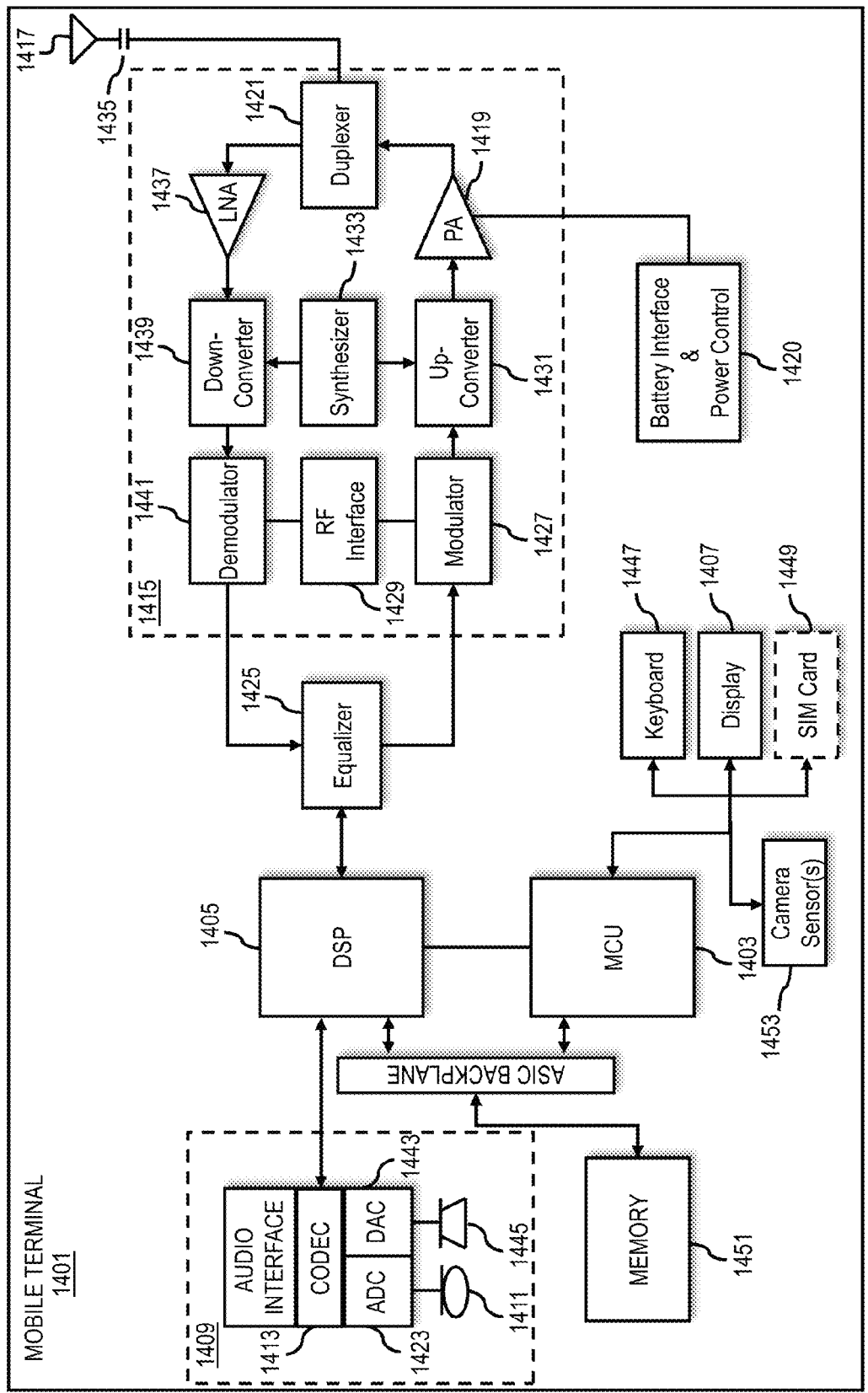
FIG. 14 is a diagram of a mobile terminal (e.g., handset) that can be used to implement an embodiment of the invention.

FIG. 14 is a diagram of exemplary components of a mobile terminal (e.g., handset) for communications, which is capable of operating in the system of FIG. 1, according to one embodiment. In some embodiments, mobile terminal 1401, or a portion thereof, constitutes a means for performing one or more steps of causing an initiation of at least one communication session between at least one parking vehicle and one or more proximate parked vehicles to determine at least one measure of space associated with the one or more proximate parked vehicles to determine an adjustment of a parking position of the at least one parking vehicle relative to the one or more proximate parked vehicles. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile terminal functions that perform or support the steps of causing an initiation of at least one communication session between at least one parking vehicle and one or more proximate parked vehicles to determine at least one measure of space associated with the one or more proximate parked vehicles to determine an adjustment of a parking position of the at least one parking vehicle relative to the one or more proximate parked vehicles. The display 1407 includes display circuitry configured to display at least a portion of a user interface of the mobile terminal (e.g., mobile telephone). Additionally, the display 1407 and display circuitry are configured to facilitate user control of at least some functions of the mobile terminal. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile terminal 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403 which can be implemented as a Central Processing Unit (CPU).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile terminal 1401 to cause an initiation of at least one communication session between at least one parking vehicle and one or more proximate parked vehicles to determine at least one measure of space associated with the one or more proximate parked vehicles to determine an adjustment of a parking position of the at least one parking vehicle relative to the one or more proximate parked vehicles. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the terminal. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile terminal 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable storage medium known in the art. The memory device 1451 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1449 carries, for instance, important information, such as the cellular phone number, the carrier supplying service, subscription details, and security information. The SIM card 1449 serves primarily to identify the mobile terminal 1401 on a radio network. The card 1449 also contains a memory for storing a personal telephone number registry, text messages, and user specific mobile terminal settings.

Further, one or more camera sensors 1453 may be incorporated onto the mobile station 1401 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    initiating at least one communication session between a parking vehicle and one or more proximate parked vehicles;
    determining at least one measure of space associated with the one or more proximate parked vehicles based on the at least one communication session; and
    processing the at least one measure of space to determine at least one adjustment of a parking position of the parking vehicle relative to the one or more proximate parked vehicles,
    wherein determining the at least one adjustment is based on enabling a vehicle parked in front of the parking vehicle to leave a current parking space without any adjustment in a parked position of the parking vehicle and a parked position of another vehicle parked in front of the vehicle parked in front of the parking vehicle.

2. A method of claim 1, wherein the at least one measure of space includes one or more distances in front and/or behind the one or more proximate parked vehicles, one or more distances on the right and/or left of the one or more proximate parked vehicles, or a combination thereof.

3. A method of claim 1, further comprising:
    determining the at least one adjustment based on enabling the parking vehicle to leave a parking space.

4. A method of claim 1, further comprising:
    determining one or more dimensions associated with the parking vehicle; and
    comparing between the at least one measure of space and the one or more dimensions,
    wherein the at least one adjustment is based, at least in part, on the comparison.

5. A method of claim 1, wherein the at least one adjustment of the parking position is based on one or more manual adjustments, one or more automated adjustments, or a combination thereof associated with the parking vehicle.

6. A method of claim 1, further comprising:
    processing one or more sensors associated with the one or more parked vehicles, the parking vehicle, or a combination thereof to determine the at least one measure of space.

7. A method of claim 1, further comprising:
    determining contextual information associated with the one or more proximate parked vehicles,
    wherein the at least one adjustment is further based, at least in part, on the contextual information.

8. A method of claim 1, further comprising:
    presenting the at least one adjustment of the parking position on one or more devices associated with the user of the parking vehicle, the parking vehicle, or a combination thereof,
    wherein the presentation includes one or more indicators, one or more messages, one or more alerts, or a combination thereof.

9. A method of claim 1, further comprising:
    determining one or more road conditions, one or more parking conditions, or a combination thereof associated with the one or more proximate parked vehicles,
    wherein the at least one adjustment of the parking position is further based on the one or more road conditions, the one or more parking conditions, or a combination thereof.

10. A method of claim 1, further comprising:
    determining the at least one measure of space based, at least in part, on one or more manual inputs.

11. An apparatus comprising:
    at least one processor; and
    at least one memory including computer program code for one or more programs,
    the at least one memory and the computer program code configured to, with the at least one processor, cause the apparatus to perform at least the following,
    cause an initiation of at least one communication session between a parking vehicle and one or more proximate parked vehicles;
    determine at least one measure of space associated with the one or more proximate parked vehicles based on the at least one communication session; and
    process the at least one measure of space to determine at least one adjustment of a parking position of the parking vehicle relative to the one or more proximate parked vehicles,
    wherein determining the at least one adjustment is based on enabling a vehicle parked in front of the parking vehicle to leave a current parking space without any adjustment in a parked position of the parking vehicle and a parked position of another vehicle parked in front of the vehicle parked in front of the parking vehicle.

12. A method of claim 11, wherein the at least one measure of space includes one or more distances in front and/or behind the one or more proximate parked vehicles, one or more distances on the right and/or left of the one or more proximate parked vehicles, or a combination thereof.

13. An apparatus of claim 11, wherein the apparatus is further caused to:
   determine the at least one adjustment based on enabling the parking vehicle to leave a parking space.

14. An apparatus of claim 11, wherein the apparatus is further caused to:
   determine one or more dimensions associated with the parking vehicle; and
   cause at least one comparison between the at least one measure of space and the one or more dimensions,
   wherein the at least one adjustment is based on the comparison.

15. A method of claim 11, wherein the at least one adjustment of the parking position is based on one or more manual adjustments, one or more automated adjustments, or a combination thereof associated with the parking vehicle.

16. An apparatus of claim 11, wherein the apparatus is further caused to:
   process one or more sensors associated with the one or more parked vehicles, the parking vehicle, or a combination thereof to determine the at least one measure of space.

17. An apparatus of claim 11, wherein the apparatus is further caused to:
   determine contextual information associated with the one or more proximate parked vehicles,
   wherein the at least one adjustment is further based on the contextual information.

18. An apparatus of claim 11, wherein the apparatus is further caused to:
   cause a presentation of the at least one adjustment of the parking position on one or more devices associated with the user of the parking vehicle, the parking vehicle, or a combination thereof,
   wherein the presentation includes one or more indicators, one or more messages, one or more alerts, or a combination thereof.

19. An apparatus of claim 11, wherein the apparatus is further caused to:
   determine one or more road conditions, one or more parking conditions, or a combination thereof associated with the one or more proximate parked vehicles,
   wherein the at least one adjustment of the parking position is further based on the one or more road conditions, the one or more parking conditions, or a combination thereof.

20. An apparatus of claim 11, wherein the apparatus is further caused to:
   determine the at least one measure of space based on one or more manual inputs.

* * * * *